United States Patent [19]

Smith et al.

[11] Patent Number: 5,612,838
[45] Date of Patent: Mar. 18, 1997

[54] OXIDATION-STABILIZED HYDROCARBON LIQUID BEARINGS FOR LUBRICATED DISK DRIVES

[75] Inventors: James H. Smith, Woodside, Calif.; Walter Wong, Boulder, Colo.

[73] Assignee: Conner Peripherals, Inc., San Jose, Calif.

[21] Appl. No.: 541,011

[22] Filed: Oct. 11, 1995

Related U.S. Application Data

[63] Continuation of Ser. No. 205,184, Mar. 2, 1994, abandoned.

[51] Int. Cl.$^6$ .................................. G11B 5/60; G11B 5/71
[52] U.S. Cl. ................... 360/102; 360/103; 428/694 TP; 508/532
[58] Field of Search ...................... 252/9, 12, 58, 252/397, 401, 404, 406; 428/694 TP, 694 TF; 360/102, 103

[56] References Cited

U.S. PATENT DOCUMENTS

| | | | |
|---|---|---|---|
| 3,778,308 | 12/1973 | Roller et al. | 117/234 |
| 4,059,534 | 11/1977 | Morro et al. | 252/32.7 E |
| 4,528,109 | 7/1985 | Fifolt et al. | 252/78.1 |
| 4,601,950 | 7/1986 | Iida et al. | 428/421 |
| 4,673,997 | 6/1987 | Gowda et al. | 360/107 |
| 4,713,287 | 12/1987 | Nishikawa et al. | 428/336 |
| 4,778,707 | 10/1988 | Arioka et al. | 428/141 |
| 4,816,334 | 3/1989 | Yokoyama et al. | 428/336 |
| 4,839,244 | 6/1989 | Tsukamoto | 428/694 |
| 4,849,291 | 7/1989 | Yacobucci et al. | 428/422 |
| 4,863,809 | 9/1989 | Brar et al. | 428/623 |
| 5,097,368 | 3/1992 | Lemke et al. | 360/97.02 |
| 5,114,798 | 5/1992 | Tsai et al. | 428/611 |
| 5,190,682 | 3/1993 | Harris | 252/565 |
| 5,278,711 | 1/1994 | Gregory et al. | 360/103 |
| 5,285,337 | 2/1994 | Best et al. | 360/97.02 |
| 5,364,994 | 11/1994 | Scharf | 585/3 |

FOREIGN PATENT DOCUMENTS

| | | |
|---|---|---|
| 0127444 | 12/1984 | European Pat. Off. . |
| 0206516 | 12/1986 | European Pat. Off. . |
| 0367510 | 5/1990 | European Pat. Off. . |
| 0523843 | 1/1993 | European Pat. Off. . |
| 0522714 | 1/1993 | European Pat. Off. . |
| 2650580 | 5/1977 | Germany . |
| 60-209917 | 10/1985 | Japan . |
| 62-103837 | 5/1987 | Japan . |
| 5054369 | 5/1993 | Japan . |
| 767448 | 2/1957 | United Kingdom . |
| WO94/11878 | 5/1994 | WIPO . |
| WO94/11879 | 5/1994 | WIPO . |

*Primary Examiner*—Stevan A. Resan
*Attorney, Agent, or Firm*—Fliesler, Dubb, Meyer & Lovejoy LLP

[57] ABSTRACT

In liquid disk drives, liquid bearing materials based on hydrocarbon liquids, halogenated liquids and mixtures thereof are used at the head-disk interface. Additives such as antioxidants and boundary layer lubricants may be incorporated to enhance oxidative stability and lubricity. The liquid bearing materials have relatively low viscosities and non-Newtonian flow characteristics so as to reduce drag at the read/write head compared with Newtonian liquid bearing materials.

10 Claims, 9 Drawing Sheets

OXIDATION-STABILIZED HYDROCARBON LIQUID BEARINGS FOR LUBRICATED DISK DRIVES

This application is a file wrapper continuation application of U.S. patent application Ser. No. 08/205,184, filed Mar. 2, 1994 abandoned.

BACKGROUND OF THE INVENTION

1. Field of the Invention

The invention relates to data storage technology, and in particular, to data storage devices utilizing liquid bearing materials at the interface between storage media and a data recording head, to methods of writing and reading data using such liquid bearing materials and to the bearing materials themselves.

2. Description of the Related Art

In most conventional disk drives, a read/write head moves over an air cushion or "bearing" that supports the head above a magnetic recording disk surface. Other drives, as described, for example, in European Patent Application No. 0367510 and U.S. Pat. No. 5,097,368, use liquids such as hydrocarbons, in particular normal hexadecane, and fluorinated compounds, such as polyfluoropolyether (PFPE), respectively, as liquid bearing materials at the head-disk interface.

A number of problems have been associated with such conventional liquid bearing materials. Some liquid bearing materials can evaporate readily from the disk surface and from within the drive housing to the ambient surroundings. Also, drive operating and/or storage conditions may be relatively too cold so that conventional liquid bearing materials, such as hydrocarbons including n-hexadecane, freeze and therefore cannot function as desired. Likewise, many hydrocarbon liquids are inappropriate as liquid bearing materials because of their tendency to oxidize. In addition, some materials, such as some esters and ketones may insufficiently wet the disk surface because of undesirably high surface tension. Other materials, such as PFPE, are difficult to transport within the drive because of inadequate surface tension. Also, some materials may be too viscous or may be incompatible with so-called disk lubricants applied during standard thin film disk manufacturing techniques to be useful liquid bearing materials for the head-disk interface.

Other problems can occur where the liquid bearing material is also used as a drive lubricant, i.e., where the liquid bearing/lubricant is cycled, as by wicking, between the head-disk interface and the drive elements. For instance, some liquid bearing materials act as solvents with respect to drive elements such as adhesives and plastics, thereby having deleterious effects on the drive. In particular, some substances can be dissolved from these elements and over time can oxidize or otherwise breakdown because of the severe temperature, pressure and shear conditions at the head-disk interface. Deposits can form thereby on the head, forcing the head away from the disk and impeding accurate information transfer between the head and the disk.

Antioxidants are commonly used in rubbers, petroleum-based products, adhesives and foods for retarding oxidation by atmospheric oxygen. Antiwear agents, such as boundary layer lubricants, can further reduce friction and wear by forming surface films known to adsorb chemically or physically onto the surfaces to be lubricated. While these are commonly used additives in other technologies, the disk drive industry has not utilized such in conjunction with conventional liquid bearing materials at the head-disk interface.

Mere incorporation of additives may be insufficient in and of itself to make a serviceable liquid bearing material. For example, PFPE exhibits sufficient oxidative stability to obviate need for antioxidant additives, but has inadequate surface tension to wick, impeding its circulation within a disk drive. Moreover, for other potential liquid bearing materials, any enhancement to long-term stability might be achieved at the expense of lubricative properties, drive and/or head performance, especially in terms of the accuracy of information transfer.

SUMMARY OF THE INVENTION

Thus, it is an object of the present invention to provide a liquid bearing material suitable for use at the head-disk interface in a high capacity information storage device such as a Winchester-type disk drive, thereby providing a so-called liquid disk drive.

A further object of the present invention is to provide an improved liquid disk drive.

A still further object of the present invention is to provide a liquid disk drive capable of supporting a high data density.

Another object of the present invention is to provide adequate head support and lubrication by a liquid bearing material.

An additional object of the present invention is to provide a liquid bearing material that does not degrade drive performance in general and head performance in particular.

A further object of the present invention is to reduce drag at the head-disk interface, and thereby reduce drive power requirements.

An additional object of the present invention is to retard oxidation of the liquid bearing material and of organic components that may be extracted into the liquid bearing material from internal drive elements.

A still further object of the present invention is to provide an improved method of writing and reading data utilizing a liquid disk drive.

An additional object of the present invention is to provide a liquid bearing material for the head-disk interface that is compatible with internal drive elements.

Yet another object of the present invention is to provide a liquid bearing material that adequately wets the surface of a disk.

These and other objects of the present invention are provided by use of liquid bearing materials comprising non-Newtonian liquids, including hydrocarbons, halogenated compounds and mixtures thereof, and which may include antioxidants, to support a head moving over the liquid bearing material and across the disk surface in a liquid disk drive.

In a further aspect of the present invention, the liquid bearing material includes pure hydrocarbon or pure halocarbon liquids and may also include hydrocarbon mixtures and mixtures of hydrocarbons with halogenated compounds.

In an additional aspect of the present invention, the liquid bearing material includes a boundary layer lubricant that can further reduce drag at the head-disk interface.

BRIEF DESCRIPTION OF THE DRAWINGS

The invention will be better understood by reference to the figures of the drawings wherein.

DESCRIPTION OF THE PREFERRED EMBODIMENTS

The present invention provides a non-Newtonian liquid bearing material acting between a rigid disk and head components of a head-disk assembly (HDA) used in information recording systems such as disk drives of the Winchester type. Such a HDA is described in detail elsewhere, for example, in the previously mentioned U.S. Pat. No. 5,097,368, hereby incorporated in its entirety by reference.

Selection of appropriate liquids, antioxidants and boundary layer lubricants as ingredients for liquid bearing materials according to the present invention should be consistent with the operating conditions and specifications established for the particular information storage device with which the bearing material is to be used. For example, a Winchester-type disk drive is typically specified to operate at temperatures between 5° C. and 55° C. In addition, such a drive is typically specified to operate satisfactorily after storage at temperatures as low as −40° C. Drive lifetime is typically specified to be at least five years. The flying height is about 1 to 1.5 microinches (μin). Disk rotation during information transfer is usually above 3000 rpm.

Moreover, the liquid bearing material should not degrade head performance, such that the performance falls below established standards for particular heads used in the liquid disk drive. Desirably, PW50 (i.e., recorded signal pulse width at half-height, in nanoseconds (nsec)) and signal strength (i.e., amplitude or height of signal pulse in microvolts (μV)) values remain constant over the long term at a given flying height, radius and linear velocity.

In view of these requirements, appropriate liquid bearing materials must have both adequate physical properties and adequate chemical properties to maintain the head at the desired flying height above the disk, remain stable and in liquid form, and sufficiently wet the disk surface.

Consistent with these specifications, a liquid bearing material according to the present invention should be incompressible relative to air and not be so viscous as to increase drag and thereby undesirably increase power requirements of the drive.

In order to have sufficiently low drag in view of the low flying heights, high rotational speeds and resultant high shear conditions extant at the head-disk interface, the liquid bearing material must exhibit non-Newtonian behavior. Generally, under conditions of high shear, non-Newtonian fluids exhibit a variable relationship between shear stress and rate of shear. Under these conditions, viscosity is not constant in non-Newtonian fluids but is rather a function of shear stress. Consequently, fluids characterized as non-Newtonian have particularly desirable flow properties at the high shear conditions at the head-disk interface, so that drag can be relatively lower than for Newtonian fluids. (Further definition and discussion of non-Newtonian fluid flow is given in the *Chemical Engineers' Handbook*, 5th ed., Robert H. Perry, Editors, 1973, pages 5–38 through 5–40, incorporated herein by reference.)

For liquid bearing materials according to the present invention, a viscosity (at 25° C.) range is desirably between about 1 centiStoke (cS) and about 20 cS. A more preferred range is between about 3 cS and about 6 cS. An even more preferred range is between about 4 cS and about 4.5 cS.

Likewise, desirable wetting and flow characteristics of the liquid bearing material depend on surface tension. For ease of application to the disk surface, such as by wicking, and adequate disk wetting characteristics, the surface tension of the liquid bearing material at 25° C. should be between about 20 dynes/cm and about 35 dynes/cm. A more preferred range is between about 25 dynes/cm and about 30 dynes/cm.

In addition, the liquid bearing material must remain in the liquid state and maintain its composition at drive conditions throughout the lifetime of the drive. Therefore, vapor pressures are desirably such, at drive operating conditions, as to balance evaporation and condensation of components of the liquid bearing material. Moveover, the boiling and freezing points for the liquid bearing material should be such that the bearing material can function as desired without being adversely affected at the specified operating and storage temperatures for the drive.

The liquid bearing material must be compatible with intradrive elements such as gaskets, adhesives, and plastic insulation. In particular, the liquid bearing material should not act as a good solvent for these elements, extracting therefrom deleterious amounts of organic components that can polymerize and form undesirable residues at the head. In addition, the liquid bearing material should not cause intradrive components to decompose, swell or otherwise deform.

The composition of the liquid bearing material is desirably constant over the drive lifetime to maintain the bearing material in the liquid state at drive operating conditions. In addition, the bearing material preferably remains in the liquid state at storage temperatures. Moreover, constant composition facilitates prediction and control of the performance of the liquid bearing material. Changes in composition with time can be brought about by evaporation of relatively more volatile components or by fractional distillation due to the relatively high temperatures induced, for example, at the head-disk interface.

Also, the liquid bearing material should be non-toxic and odorless in case of leaks to the environment outside the drive housing.

Components of the liquid bearing material should have sufficient stability to avoid significant oxidative degradation over the five-year drive lifetime.

Suitable liquid bearing materials meeting some of these criteria include halogenated compounds (e.g., those having at least two different halogens) since such compounds typically do not oxidize. However, in general, fully fluorinated compounds (e.g., perfluorocarbons and perfluoropolyethers) fail to satisfy the surface tension criterion in that these compounds exhibit surface tensions less than about 18 dynes/cm at 25° C. Halogenated oils such as those available commercially as under the tradename KEL-F™ from 3M Company of St. Paul, Minn. and under the tradename Halocarbon Oil from Halocarbon Products Company of Riveredge, N.J. have sufficiently high surface tensions to be useful alone as liquid bearing materials.

Straight and branched chain hydrocarbons such as pure 2,2,4,4,6,8,8-heptamethylnonane, a branched $C_{16}$ hydrocarbon (herein referred to as heptamethylnonane), available from Humphrey Chemical Company of New Haven, Conn., can also satisfy all of the above criteria and are suitable as liquid bearing materials according to the present invention. The structure of 2,2,4,4,6,8,8-heptamethylnonane is illustrated below:

Note that only the sixth carbon on the chain has a single hydrogen, referred to herein as a tertiary hydrogen.

Heptamethylnonane may also be used in a mixture. Such a mixture can include halogenated polyolefin polymers such as those of chlorotrifluoroethylene (CTFE), $(CF_2CFCl)_n$, available commercially as Halocarbon Oils and as a KEL-F™ liquid. Other branched hydrocarbons such as isoparaffins may be suitable. Isoparaffins are commercially available under the tradename ISOPAR™ from Exxon Chemical Company of Houston, Tex. Typically, aromatic and cyclic hydrocarbons can be expected to not meet the temperature requirements for Winchester-type drives; for example, they can freeze at drive storage conditions. In addition, aromatic and cyclic hydrocarbons commonly have insufficient oxidative stability for purposes of the present invention. Also, such compounds may be toxic.

Another suitable mixture for a liquid bearing material includes polyalphaolefins, polymers of 1-decene, and halogenated polyolefin polymers such as CTFE, described above. A suitable polyalphaolefin is Nye 167A, containing a mixture of long ($C_{20}$ range) branched chain olefins, available from W. F. Nye Corp. of New Bedford, Mass. Polyalphaolefins may also be mixed with one or more normal $C_{12}$-$C_{15}$ hydrocarbons. Normal $C_{12}$-$C_{15}$ hydrocarbon mixtures may be purchased under the tradename NORPAR™, commercially available from Exxon Chemical Company of Houston, Tex.

The complex composition of polyalphaolefins, isoparaffins and isoparaffin mixtures may contain undesirably high concentrations of oxidatively reactive species such as olefinic, cyclic and aromatic hydrocarbons. However, because of their relatively high viscosities, polyalphaolefins, isoparaffins, and isoparaffin mixtures can be used advantageously in mixtures with other compounds to adjust the overall viscosity of the liquid bearing material to within the desired range. In addition, in such a mixture, polyalphaolefins, isoparaffins, such as heptamethylnonane, and isoparaffin mixtures can depress the overall freezing point sufficiently so that normal hydrocarbons can be satisfactorily utilized in a liquid bearing material at temperatures close to or below their freezing points.

Selected properties of liquid bearing materials according to the present invention are presented, along with those for a conventional liquid bearing material such as polyfluoropolyether (PFPE), a perfluorinated liquid, in Table 1 below. Note especially the relatively high surface tensions of liquid bearing materials according to the present invention.

TABLE 1

| Liquid Bearing Material | Viscosity at 25° C. cP | Viscosity at 25° C. cS | Pour Point °C. | Boiling Point °C. | Vapor Pressure at 25° C. Torr | Surface Tension dyne/cm |
|---|---|---|---|---|---|---|
| PFPE | 3.2 | 1.8 | −97 | 175 | ~1 | 18 |
| $(CF_2CFCl)_n$ | 1.6 | 0.9 | −129 | | 10 | 23 |
| Polyalphaolefin Nye 167A | 6.4 | 8 | −65 | | | 25–27 |
| $C_{14}$–$C_{15}$ isoparaffins | 1.6 | 2.1 | | 198 | 5.2 | 25.9 |
| $C_{16}$–$C_{20}$ isoparaffins | 2.6 | 3.3 | −18 | 237 | 3.1 | 26.6 |
| $nC_{15}$ | 2.5 | 3.3 | +7 | 267 | | 27 |
| 2,2,4,4,6,8,8-Heptamethylnonane | 3.3 | 4.2 | <−40 | 240 | 0.05 | 25–27 |

Antioxidants

Antioxidants are useful to inhibit oxidation of the hydrocarbon liquid bearing material and of organic components that may be released from intradrive elements. Antioxidants are not essential for liquid bearing materials of pure halocarbon oils and/or of certain pure hydrocarbons, namely those branched hydrocarbons in which there are no hydrogens located α (i.e., immediately adjacent) to carbons having tertiary hydrogens, i.e., hydrogens attached to a carbon to which is also attached three carbon atoms. While not wishing to be bound by any theory, it is believed that the oxidative stability of heptamethylnonane and similar compounds, is due to the absence of hydrogens located α to carbons to which tertiary hydrogens are attached.

Suitable antioxidants are of the free radical chain terminating type and include, by way of example only, phenols, such as butylated hydroxytoluene (BHT), amines, such as p,p'-dioctyldiphenylamine, phenol condensation products, such as benzenepropanoic acid, 3,5-bis(1,1-dimethyl ethyl (-4-hydroxy-) thio-2,1-ethanediyl ester) available under the tradename IRGANOX™ 1035 from Ciba Geigy Corporation of Hawthorne, N.Y., sulfides, such as dilaurylthiodipropionate, and certain metal salts of dithioacids. Combinations of antioxidants, such as BHT and p,p'-dioctyldiphenylamine, can act synergistically and are also useful. Metal deactivators that inhibit metal-catalyzed initiation of free radical chain reactions in the oxidation process are also useful antioxidants. One example is a copper passivator, such as that commercially available under the tradename REOMET™ 39 from Ciba Geigy Corporation of Hawthorne, N.Y.

The antioxidant used in the liquid bearing material of the present invention can be in liquid or solid form prior to dissolution in the liquid bearing material. The maximum antioxidant content is principally determined by solubility in the liquid bearing material. In particular, it is undesirable for solid antioxidant to precipitate out of the liquid bearing material solution. Thus, with respect to Winchester-type liquid disk drives, antioxidants must be soluble at 5° C., the lower operating temperature for the drives; solubility at storage temperatures about −40° C. is desirable but not essential. The minimum desirable amount of antioxidant is, in essence, that amount that is sufficient to provide adequate oxidation resistance to the liquid bearing material and any organic components extracted from intradrive elements. Levels of between about 0.0002 g/ml and about 0.02 g/ml are generally useful but the precise range varies, depending on the particular antioxidant or antioxidants used. For example, levels of BHT between about 0.001 g/ml and 0.005 g/ml are generally useful.

In addition, the antioxidant should also be compatible with drive components.

Boundary Layer Lubricants

Boundary layer lubricants can be useful in a liquid bearing material to further reduce drag at the head. Suitable boundary layer lubricants include, without limitation, those conventionally used in engine and hydraulic equipment lubricants, such as esters, ketones, and certain fatty acids and their derivatives such as stearic acid and isostearic acid. The latter is especially preferred and is available commercially as EMERSOL™ 875 through Henkel Corporation, Emery Group of Cincinnati, Ohio.

The boundary layer lubricant should also be soluble in, and remain so in, the liquid bearing material. Levels between about 0.0002 g/ml and about 0.005 g/ml are generally useful. The usual range is between about 0.001 g/ml and about 0.005 g/ml.

Figure 1:
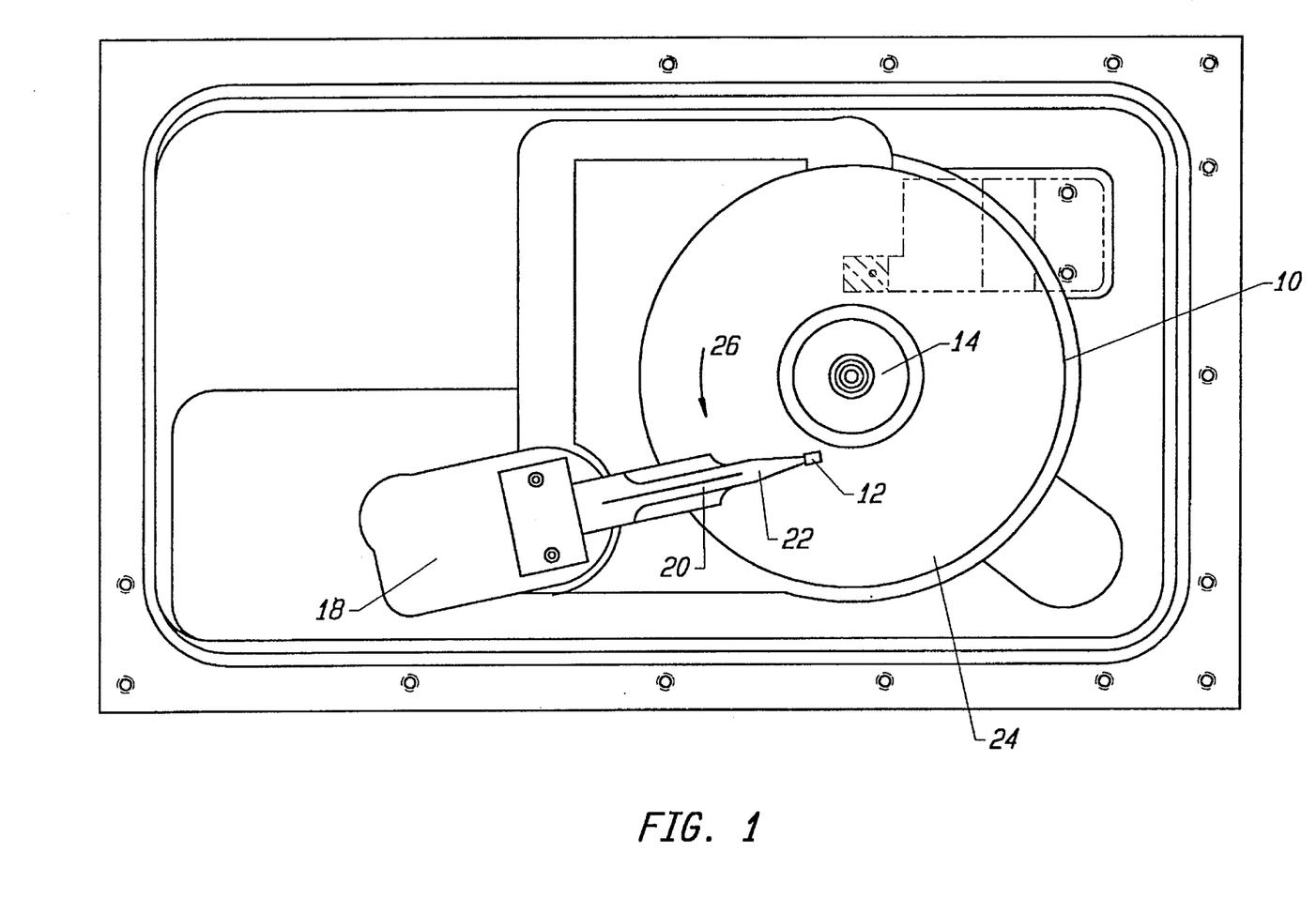
FIG. 1 illustrates a simplified diagram of a liquid bearing material according to the present invention at the interface of a head-disk assembly.

As stated above, the liquid bearing materials according to the present invention act between the rigid disk and head components of a head-disk assembly. FIG. 1 illustrates a typical head-disk assembly. The interface between a rigid disk medium 10 and a transducer 12, such as a magnetic recording head assembly, is maintained in an assembly including a means for rotating the disk. The rotating means includes a spindle 14 that fits through a circular hole in the middle of the disk 10. The transducer 12 is normally loaded by application of a pressure or force directed toward the disk. The force may be applied by an assembly including an actuator 18, a swing arm 20 and a gimballed spring suspension mechanism 22. Actuator 18 pivots the swing arm 20 to selectively position the transducer 12 radially with respect to the disk 10. Gimballed spring suspension mechanism 22 loads transducer 12 against disk 10 when the disk is stationary. A liquid bearing material 24 coats the surface of disk 10 and supports the transducer in a spaced relationship of about 1.5 microinches ($\mu$in) with the upper surface of the disk. When disk 10 rotates in the direction of arrow 26, inducing relative motion between itself and the head, liquid bearing material 24 is carried on the surface of the disk, forming the bearing that supports the head. The spacing or "flying height" between the transducer and the surface of the disk 10 is generally determined by the amount of loading exerted on the transducer 12, by the spring suspension, the aerodynamic design of the transducer 12 and rotational velocity of the disk.

While the disk rotates, conventional means, not shown, are used to operate the transducer 12 to electromagnetically read signals from and write signals to the disk. For this purpose, transducer 12 includes a wound core with a recording gap.

In a disk drive environment, means exist to continuously apply a liquid bearing material to a disk. For example, to irrigate the disk during rotation, a nozzle can be mounted to the slider or to a separate support. A wicking arrangement for renewing the liquid bearing material is taught in United States patent application entitled Lubricated Disk Drive, Ser. No. 07/976,198, filed Nov. 13, 1992, incorporated herein by reference.

To illustrate the present invention in more detail, the results of several tests are described. For each test, the information storage media were magnetic recording disks prepared by standard thin film disk manufacturing techniques. In particular, electroless nickel plated aluminum substrates were coated with 1100 Å chromium, 310 Å CoCrPt magnetic thin film and 150 Å carbon. To ensure adequate wetting of the disk by the intended bearing material, the fluorinated disk lubricant, PFPE, conventionally applied during the manufacture of standard thin film disks, was removed by stripping with FREON TF. Thereafter, the disk surface was rewetted with the fluid under evaluation, such as by pouring directly onto the disk surface.

Test fluids, including any additives, were assessed for suitability as liquid bearing materials by measuring long-term head performance data, i.e., PW50 (recorded signal pulse width at half-height, in nanoseconds (nsec)) and amplitude in microvolts ($\mu$V). For each test, the disks were wetted with the test fluid and rotated on the test apparatus at about 3300 rpm. The flying height was about 1.4 $\mu$in. The write frequency for PW50 and amplitude data was 500 kHz and 9 MHz, respectively. PW50 and amplitude data were taken at a 1-inch radius on the disk using three-pad, thin film read/write heads, subject of U.S. patent application entitled Low Drag Liquid Bearing Recording Head, Ser. No. 07/976, 442, filed Nov. 13, 1992, incorporated in its entirety herein by reference.

Long term performance for each fluid was assessed monitoring PW50 and amplitude data over several hundred hours. In addition, head performance was examined under the more exacting conditions of contact start/stop mode, during which the head repeatedly contacts the disk surface as the disk rotation is initiated and terminated over many cycles.

Three types of test apparatuses were used. The first test apparatus, referred to herein as the "Hogout Tester", for screening fluids warranting further evaluation, is a head-disk assembly mounted above a spindle motor; the test fluids were not recirculated.

Fluids that performed successfully (i.e., had acceptable PW50 and amplitude data) in the Hogout Tester were tested in a second apparatus, referred to herein as the "Ultraclean Tester". The Ultraclean Tester is a head-disk assembly similar to the Hogout Tester used in the screening tests described above but incorporates a fixed head and a wicking arrangement, the latter being that described in U.S. patent application entitled Lubricated Disk Drive, Ser. No. 07/976, 198, filed Nov. 13, 1992, referred to above, to recirculate the test fluid between the head-disk assembly and the spin motor.

Finally, fluids that performed successfully in the Ultraclean Tester were tested in a third apparatus, a Winchester-type liquid disk drive. Like the Ultraclean Tester, the drive also incorporated a wicking arrangement for circulating the test fluid.

Figure 2:
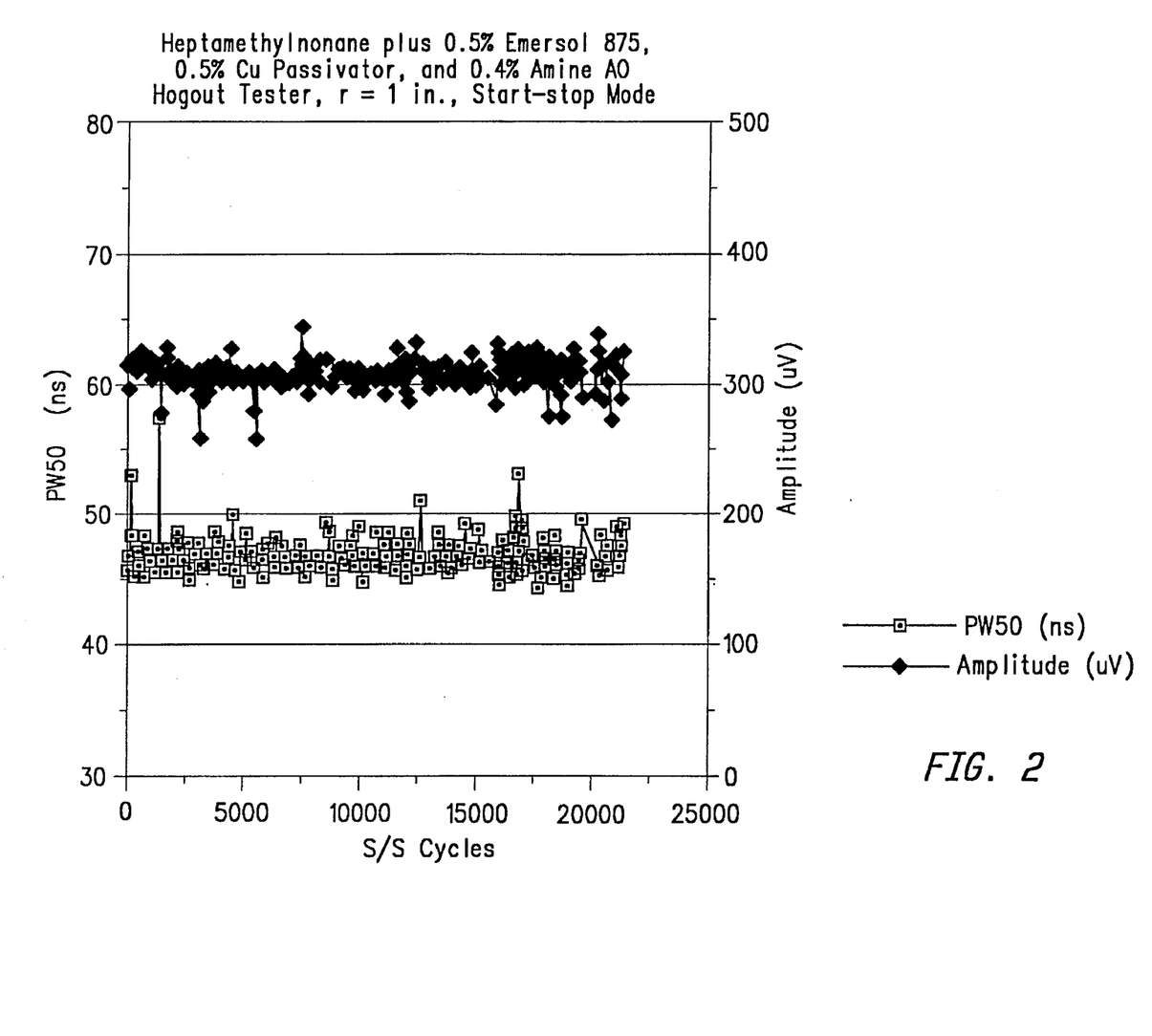
FIG. 2 illustrates PW50 and signal amplitude data from a Hogout Tester in contact start/stop mode using heptamethylnonane with a boundary layer lubricant and a combination of antioxidants according to the present invention.

FIG. 2 illustrates the performance in the Hogout Tester in contact start/stop mode of heptamethylnonane with an antioxidant combination containing 0.002 g/ml amine and 0.0005 g/ml phenolic antioxidants, 0.005 g/ml copper passivator antioxidant and 0.005 g/ml isostearic acid boundary lubricant as additives. Generally, PW50 values were substantially constant between about 40 nsec and 50 nsec and amplitude values were also substantially constant between 300 $\mu$V and 350 $\mu$V over 20,000 start/stop cycles.

Figure 3:
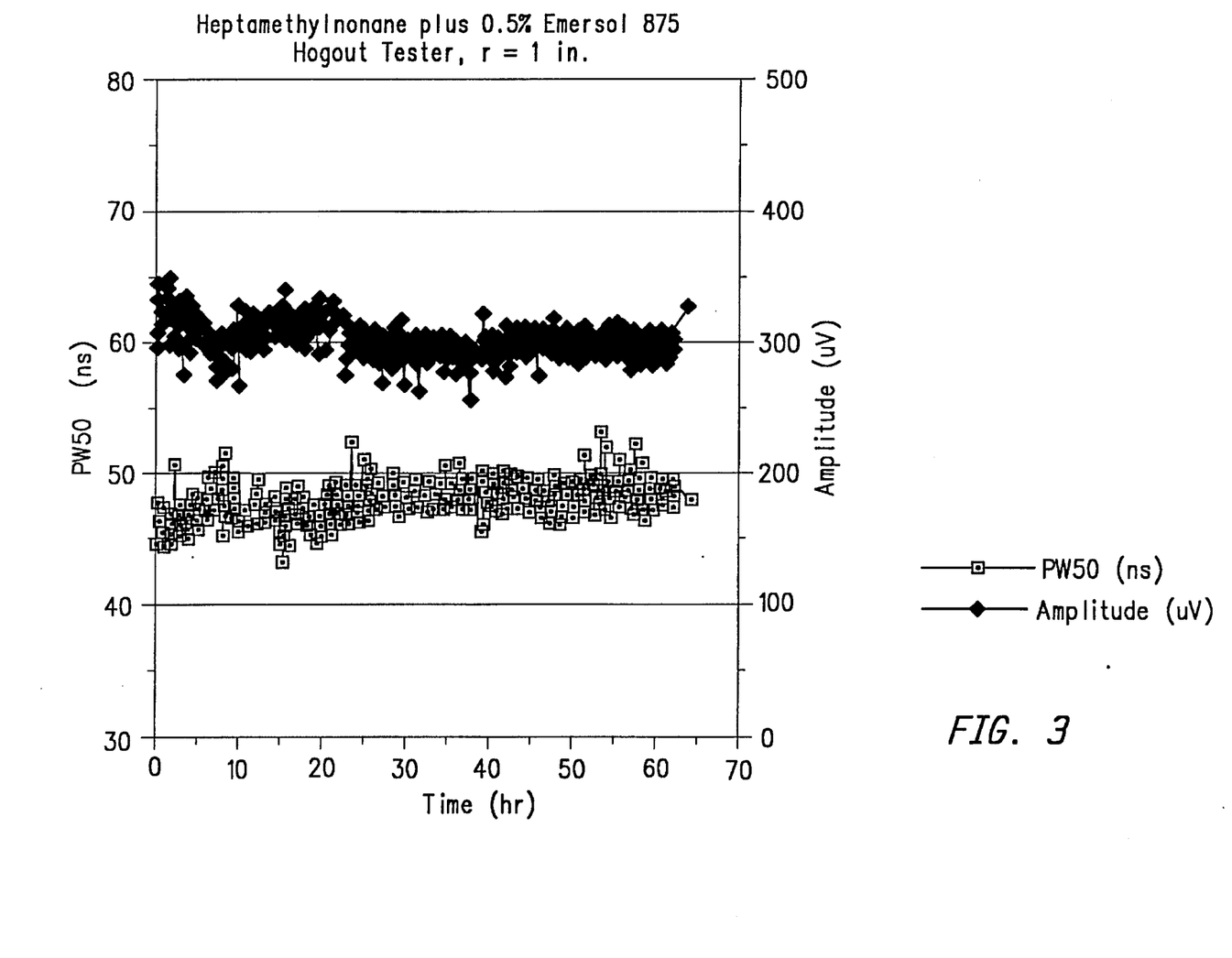
FIG. 3 illustrates PW50 and signal amplitude data from a Hogout Tester using heptamethylnonane with a boundary layer lubricant according to the present invention.

FIG. 3 illustrates the performance of heptamethylnonane with 0.005 g/ml isostearic acid in the Hogout Tester during about 65 hours of continuous operation. Generally, PW50 values were substantially constant between about 45 nsec and 50 nsec. Amplitude values were also substantially constant between about 300 µV and 350 µV.

Figure 4:
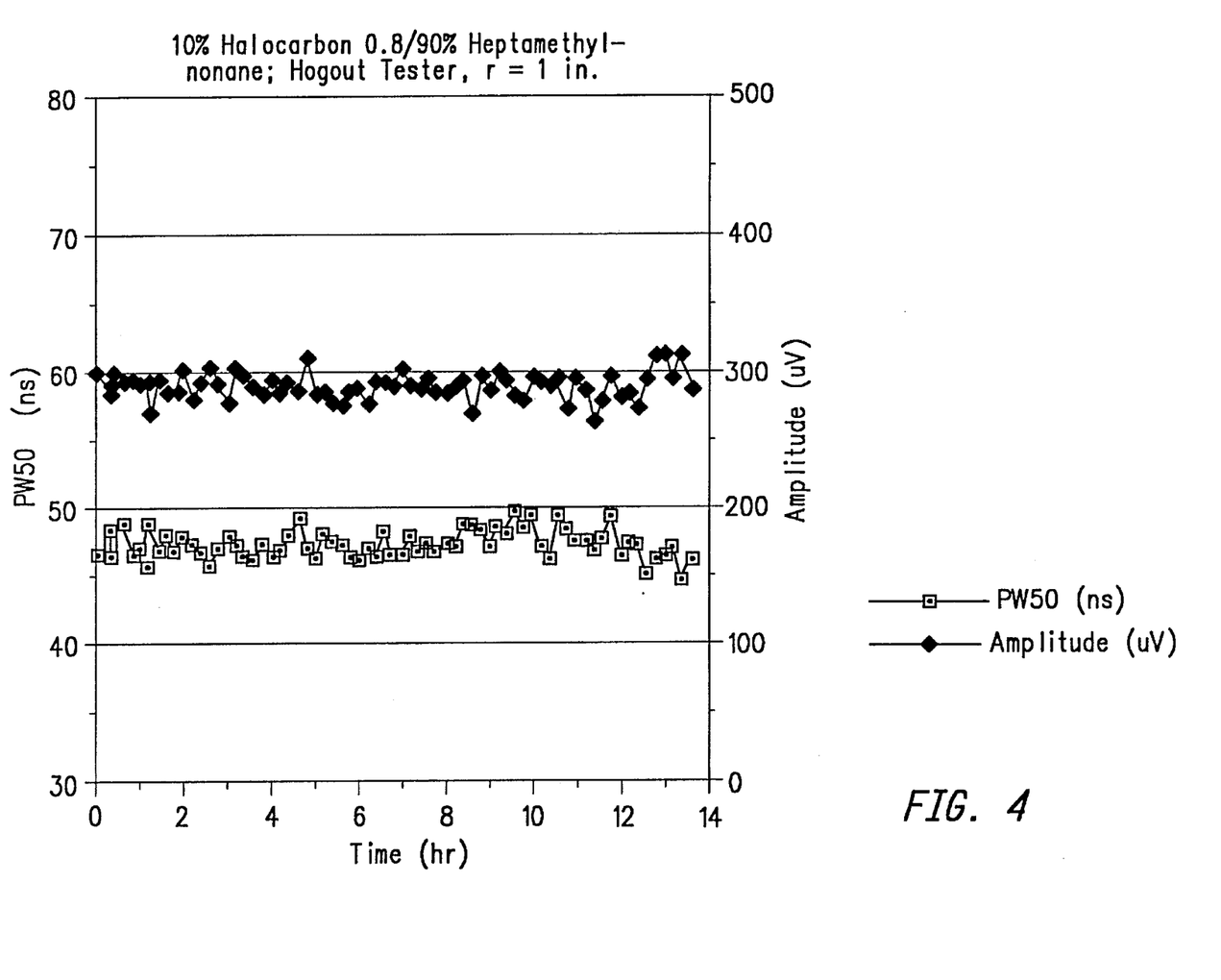
FIG. 4 illustrates PW50 and signal amplitude data from a Hogout Tester using a mixture of heptamethylnonane and a halogenated compound according to the present invention.

FIG. 4 illustrates the utility of a mixture of a hydrocarbon with a halogenated oil as the liquid bearing material. The specific mixture used in the Hogout Tester was a 9:1 (volume) mixture of heptamethylnonane with Halocarbon Oil 0.8. No antioxidants or other additives were used. PW50 values remained between 45 nsec and 50 nsec over 14 hours of continuous operation. Amplitudes were substantially constant between 250 µV and 300 µV.

Figure 5:
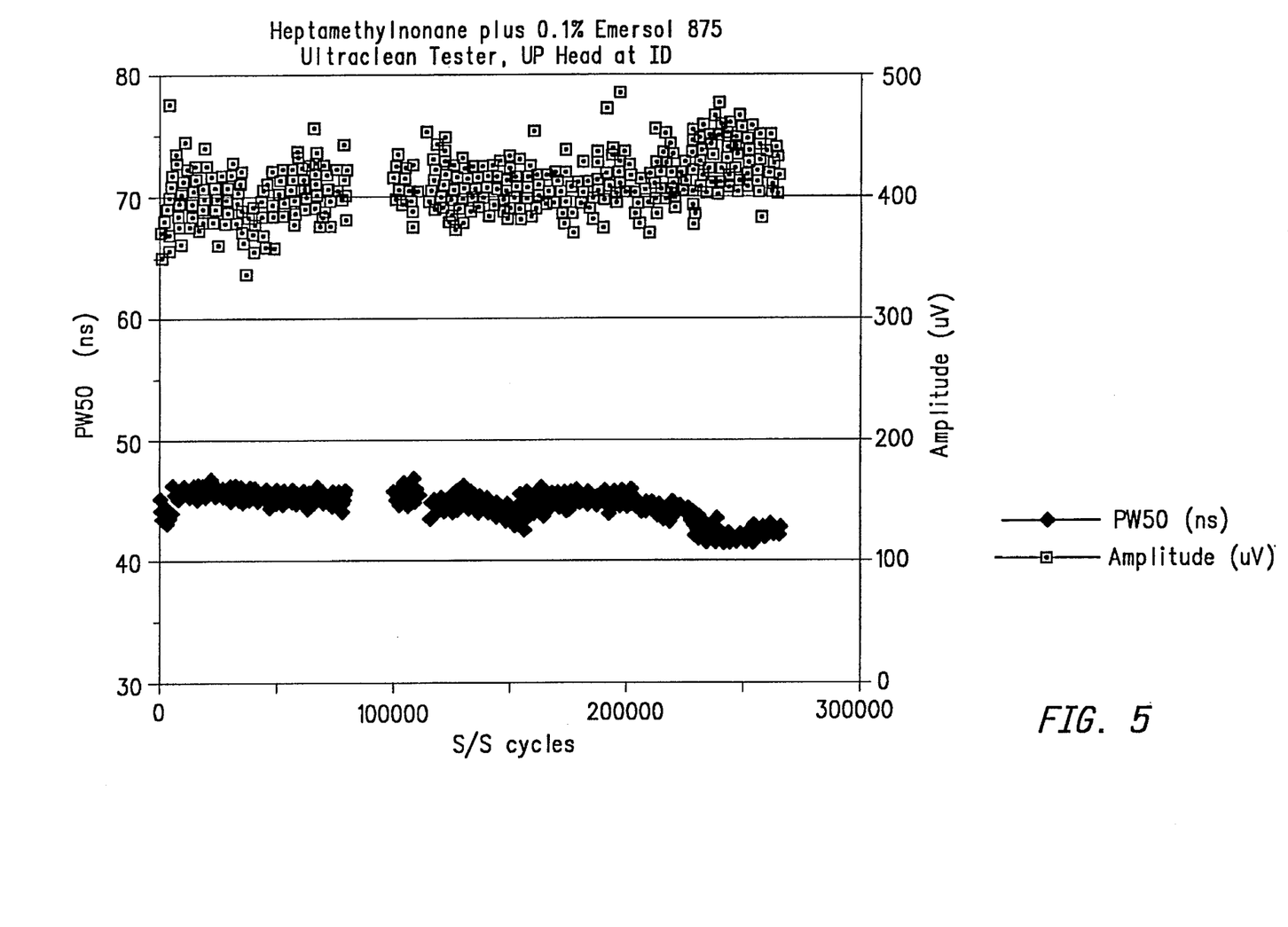
FIG. 5 illustrates PW50 and signal amplitude data from an Ultraclean Tester in contact start/stop mode using heptamethylnonane and a boundary layer lubricant according to the present invention.

FIG. 5 illustrates the performance of heptamethylnonane with 0.001 g/ml isostearic acid in the Ultraclean Tester in contact start/stop mode. PW50 values were substantially constant between 40 nsec and 45 nsec over 250,000 cycles. Amplitudes were substantially constant between 400 µV and 500 µV.

Figure 6:
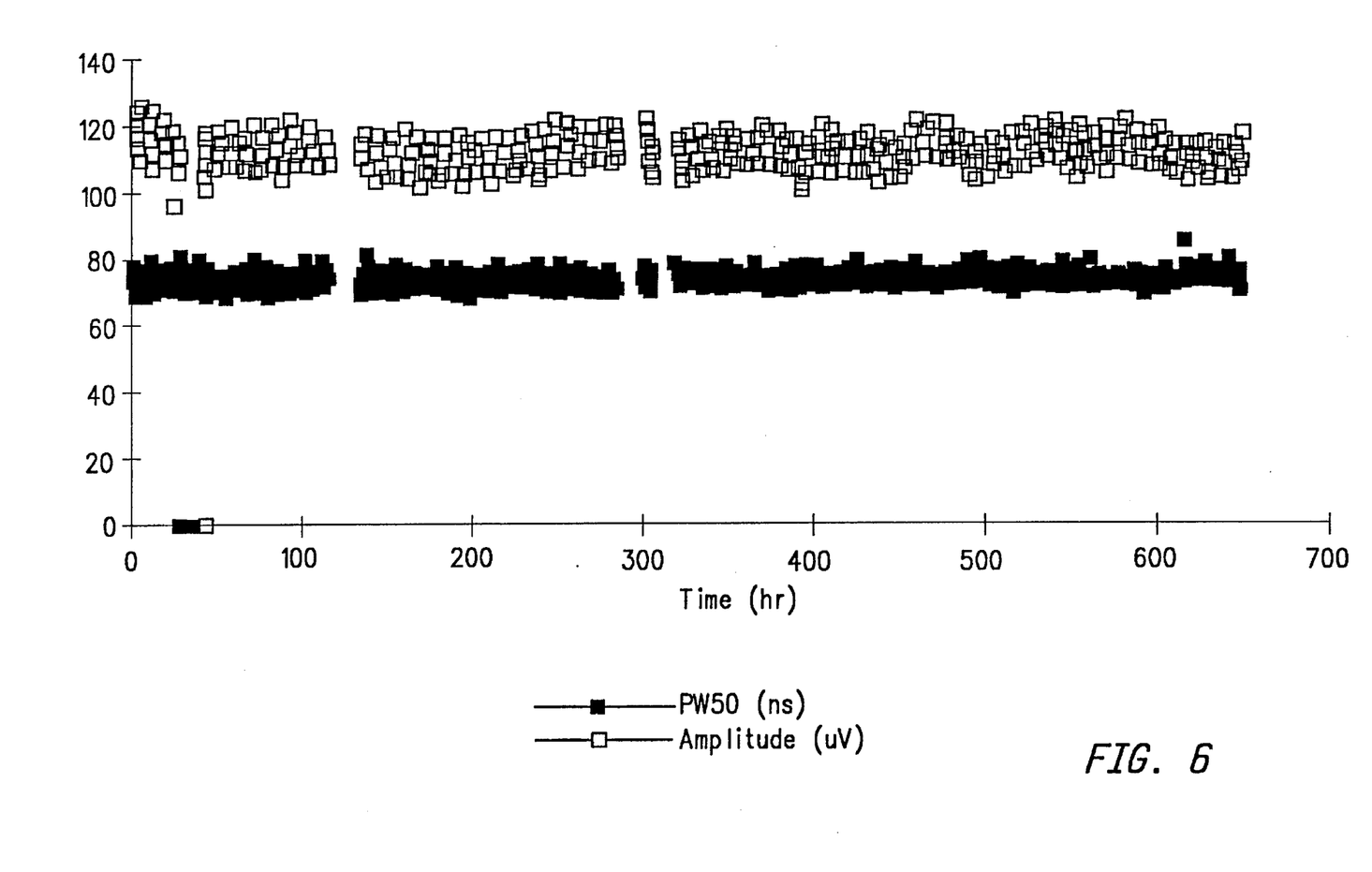
FIG. 6 illustrates PW50 and signal amplitude data from a disk drive using heptamethylnonane, BHT and amine antioxidants according to the present invention.

FIG. 6 illustrates the performance of heptamethylnonane with 0.005 g/ml BHT and 0.005 g/ml amine antioxidants in a Winchester-type disk drive during about 650 hours of continuous operation. PW50 values were constant at about 70 nsec, while amplitude values were substantially constant at between about 100 µV and 120 µV.

Figure 7:
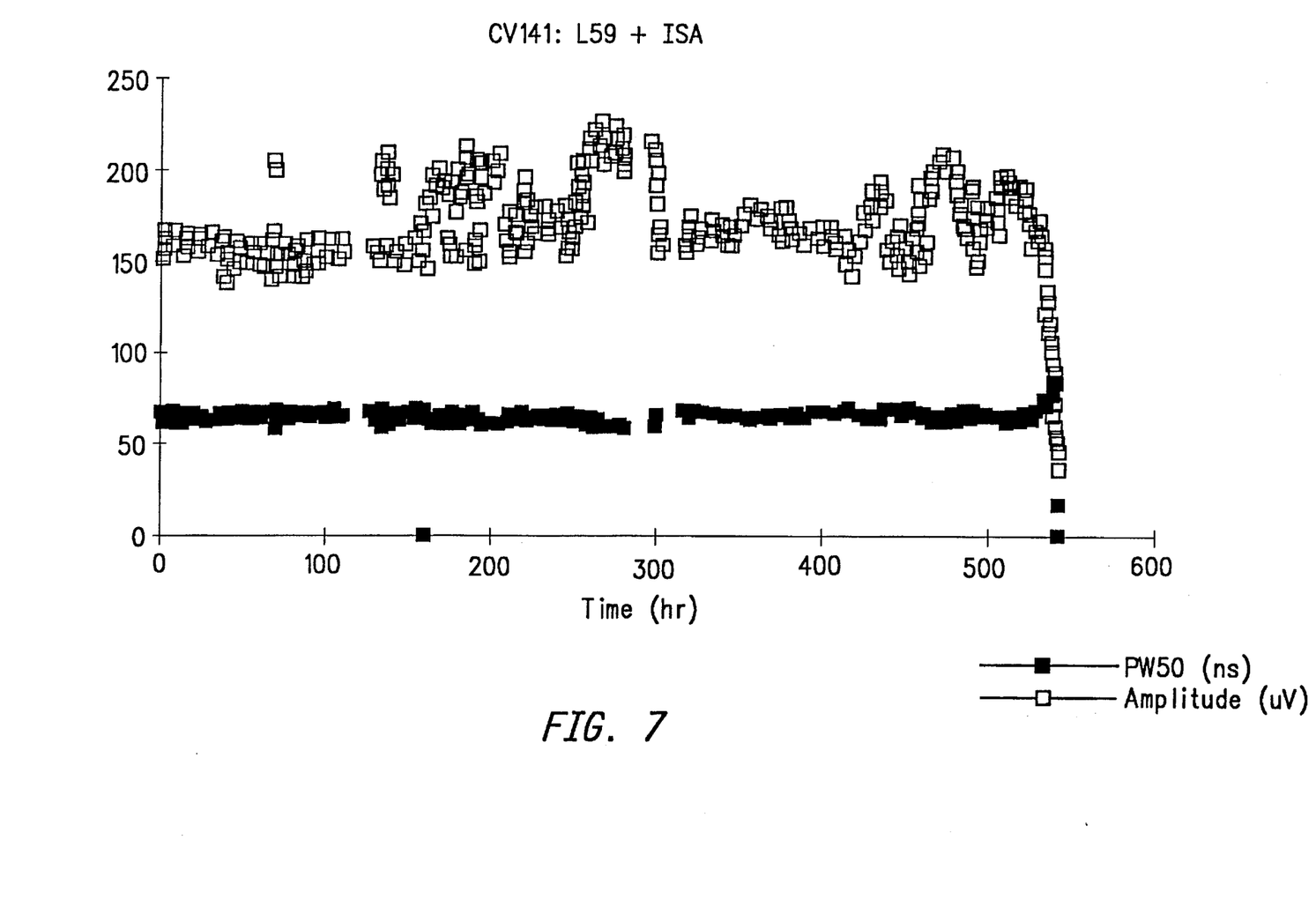
FIG. 7 illustrates PW50 and signal amplitude data from a disk drive using heptamethylnonane and isostearic acid according to the present invention.

FIG. 7 illustrates the performance in a Winchester-type drive of heptamethylnonane with 0.001 g/ml isostearic acid. PW50 values were generally about 65 nsec over 500 hours, while amplitude was initially at about 170 µV and then after about 150 hours fluctuated between 150 µV and 210 µV before dropping precipitously after 500 hours.

Figure 8A:
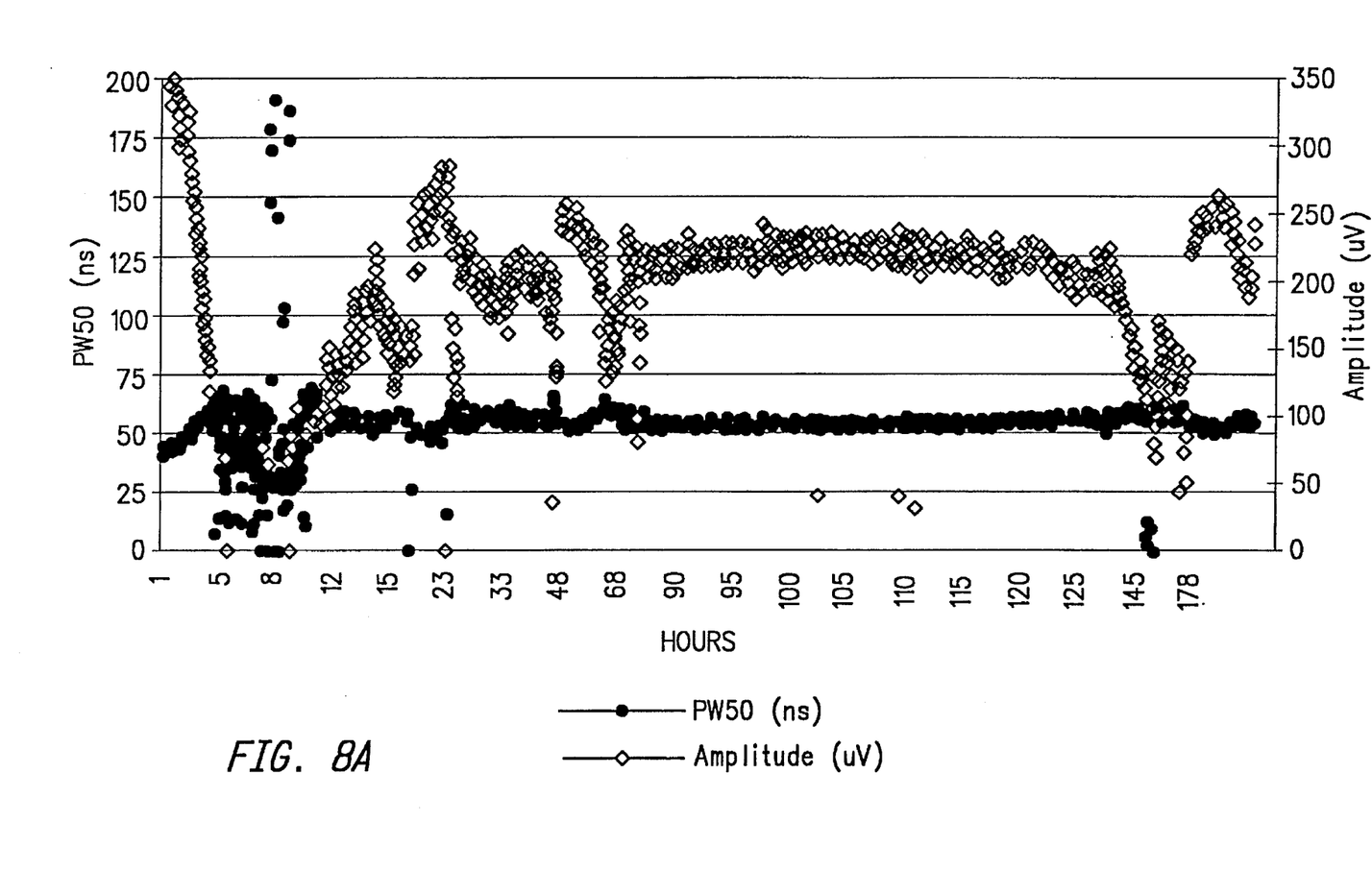
FIGS. 8A and 8B illustrate PW50 and signal amplitude data from a disk drive using heptamethylnonane alone and with BHT antioxidant according to the present invention.
Figure 8B:
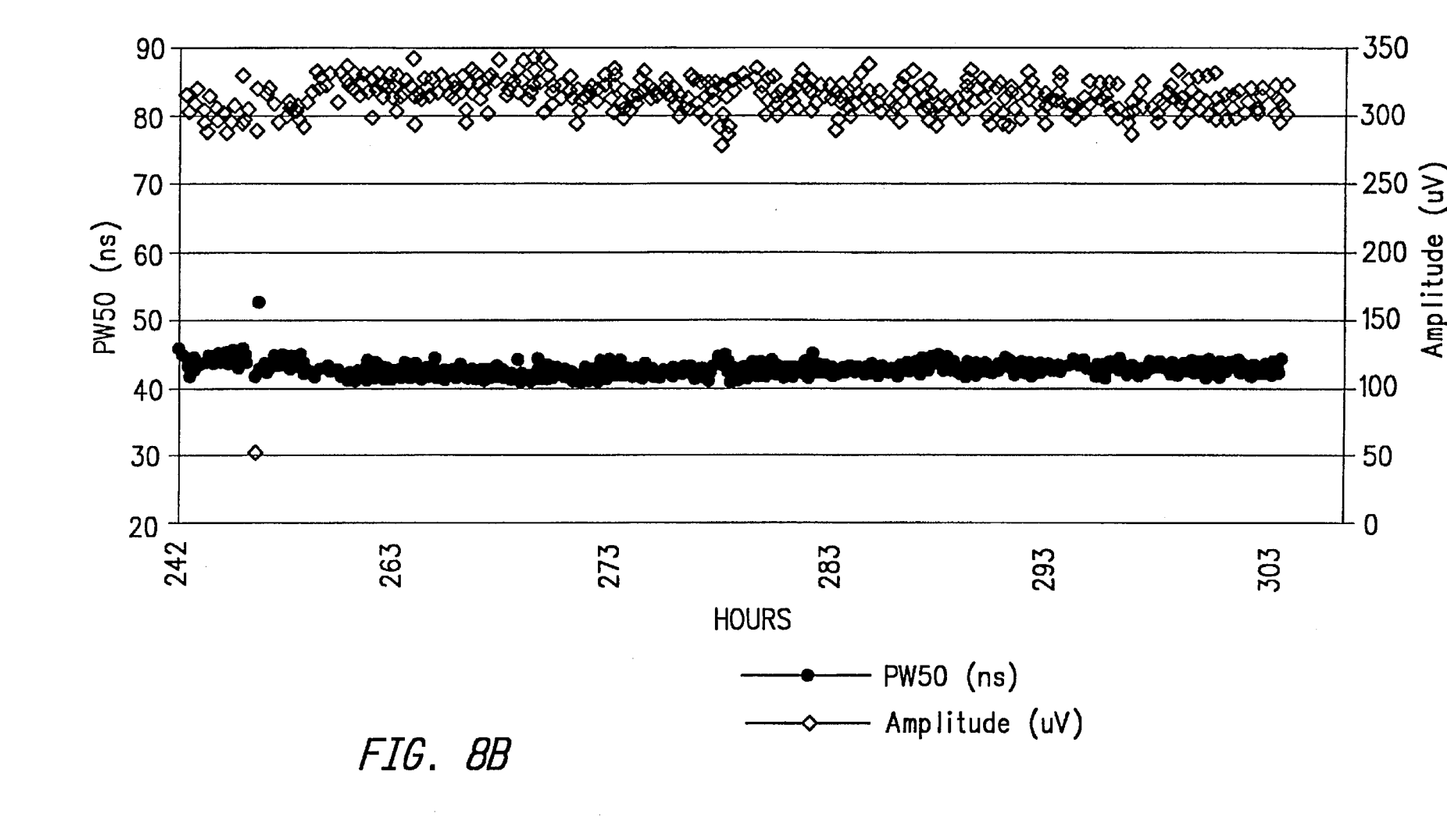

FIG. 8A illustrates the performance in a typical run in a Winchester-type liquid disk drive of heptamethylnonane without any antioxidants or boundary layer lubricants. As can be seen in FIG. 8A, after less than 4 hours, the amplitude dropped from between about 300 µV and about 350 µV to less than 40 µV. PW50 values also degraded. After about 5 hours of operation, PW50 increased to an unacceptably high 65 nsec. FIG. 8B illustrates the effect of the addition of about 0.001 g/ml BHT after the drive had been operating 85 hours with heptamethylnonane alone. After the addition of BHT, PW50 values stabilized at about 45 nsec and the amplitude increased to and remained at about 325 µV until the end of the test, 303 hours.

Industrial Applicability

In summary, the invention described herein utilizes liquids as bearing materials for liquid disk drives. The liquid bearing materials of the present invention stably support read/write heads at constant, low flying heights above a disk surface. In addition, the liquid bearing materials adequately wet the disk surface, providing for ease of application. Further, because the liquid bearing materials exhibit non-Newtonian flow characteristics at the high shear conditions at the head-disk interface, drag at the head is reduced compared with Newtonian bearing materials. Moreover, the liquid bearing materials of the present invention have sufficient oxidative resistance to remain chemically stable over the lifetime of the drive and are not good solvents with respect to intradrive elements from which organic compounds may be extracted. As a result, heads in liquid disk drives incorporating these liquid bearing materials perform reliably and satisfactorily.

Further, in the liquid bearing materials according to the present invention, a variety of substances can be used, including pure hydrocarbons, pure halogenated compounds including halocarbons, and mixtures of hydrocarbons and halogenated compounds. Additives can be easily incorporated to enhance lubricity and oxidative stability of the liquid bearing material.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features described herein, and as fall within the scope of the invention and the limits of the appended claims.

We claim:

1. An information storage system, comprising:
   a moveable information storage medium mounted within a housing;
   a head for reading and/or writing information from and/or to the storage medium spaced proximate to the storage medium;
   a non-Newtonian hydrocarbon liquid bearing consisting essentially of 2,2,4,4,6,8,8-heptamethylnonanein combination with a material for retarding oxidation that stabilizes PW50 values of the information storage system disposed between the storage medium and the head; and
   means for inducing movement of the storage medium relative to the head to enable information transfer.

2. The information storage system of claim 1, wherein the material for retarding oxidation is selected from the group consisting of phenols, amines, phenol condensation products, sulfides, and metal salts of dithioacids.

3. The information storage system of claim 2, wherein the material for retarding oxidation comprises a phenol and an amine.

4. The information storage system of claim 3, wherein the phenol comprises butylated hydroxytoluene and the amine comprises p,p'-dioctyldiphenylamine.

5. The information storage system of claim 1, further comprising a material for reducing drag at a boundary between the head and the storage medium.

6. The information storage system of claim 5, wherein the material for reducing drag comprises stearic acid or isostearic acid.

7. The information storage system of claim 5, wherein the material for retarding oxidation comprises butylated hydroxytoluene and the material for lubricating comprises isostearic acid.

8. The information storage system of claim 1, wherein the material for retarding oxidation comprises butylated hydroxytoluene.

9. An information storage system, comprising:
   a moveable information storage medium mounted within a housing;
   a head for reading and/or writing information from and/or to the storage medium spaced proximate to the storage medium;
   a non-Newtonian hydrocarbon liquid bearing in combination with a material for retarding oxidation disposed between the storage medium and the head;
   means for inducing movement of the storage medium relative to the head to enable information transfer; and
   means comprising a material for reducing drag at a boundary between the head and the storage medium,
   wherein the liquid bearing comprises 2,2,4,4,6,8,8-heptamethylnonane, the material for retarding oxidation comprises butylated hydroxytoluene, and the material for reducing drag comprises isostearic acid.

10. An information storage system, comprising;
    a moveable information storage medium mounted within a housing;

a head for reading and/or writing information from and/or to the storage medium spaced proximate to the storage medium;

a non-Newtonian hydrocarbon liquid bearing in combination with a material for retarding oxidation disposed between the storage medium and the head; and means for inducing movement of the storage medium relative to the head to enable information transfer, wherein the liquid bearing comprises 2,2,4,4,6,8,8-heptamethylnonane and the material for retarding oxidation comprises butylated hydroxytoluene.

* * * * *